Nov. 16, 1943.  L. B. WINTON  2,334,463

LIQUID LEVEL INDICATING SYSTEM

Filed Sept. 30, 1942

Inventor.
Lewis B. Winton,
by Emery, Booth, Townsend, Miller & Weidner
Attys.

Patented Nov. 16, 1943

2,334,463

UNITED STATES PATENT OFFICE 2,334,463

LIQUID LEVEL INDICATING SYSTEM

Lewis B. Winton, Greenwich, Conn., assignor to Philip A. Jerguson, Medford, Mass.

Application September 30, 1942, Serial No. 460,217

4 Claims. (Cl. 73—302)

This invention relates to liquid level indicating devices, particularly for boilers or like pressure containers, and the object is to provide an improved construction for indicating the level of liquid in the container by means of a differential hydrostatic manometer wherein the effect of the surging of the liquid in the container due to tipping of the system as a whole, such as occurs in marine use when the ship rolls or pitches, is effectually minimized.

Figure 1:
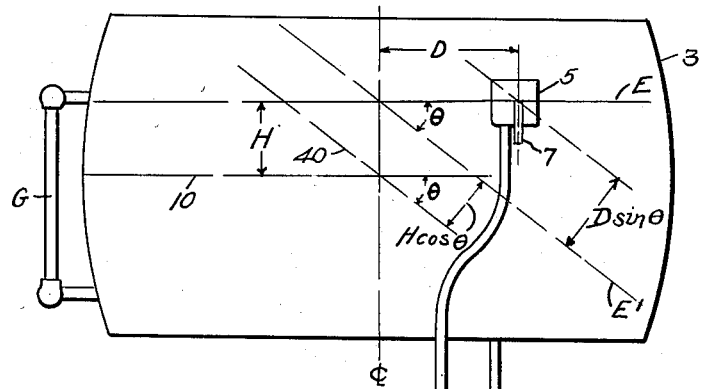
Figure 2:
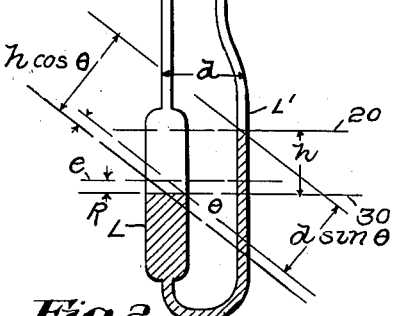
Figure 2:
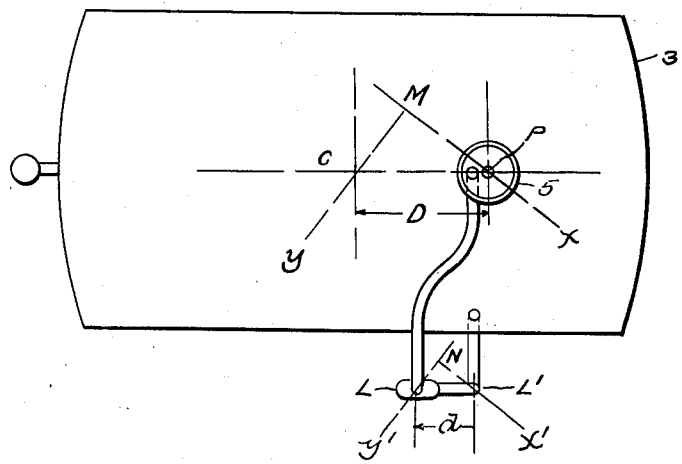

My invention will be well understood by reference to the following description taken in connection with the accompanying drawing, wherein:

Fig. 1 is a diagram corresponding generally to a vertical section through a boiler drum; and Fig. 2 is a diagram corresponding generally to a horizontal section.

Referring to Fig. 1, I have there indicated very diagrammatically a liquid container 3, which may be taken as the top drum of a marine boiler, and a U-tube manometer, herein shown as of the erect U type as distinguished from an inverted U-tube, having an indicating leg L and a companion leg L', containing a suitable manometric fluid, which in the case of the erect U-tube is heavier than water. The leg L' is connected to the water-containing spaces of the boiler 3 and the leg L to a datum chamber 5 in the form of a cup adapted to be replenished with liquid and having an overflow 7 whereby there is established therein a column of water of fixed height at a location at least as high as the normal "high water" level of the boiler and corresponding to the line E in Fig. 1. There is thus impressed upon the leg L' a variable liquid head corresponding to the actual level of water in the container and on the leg L a constant head corresponding to the height of the line E, and the difference between these heads is a function of the water level in the container and is measured by the manometer. In particular the surface of the manometric liquid in the indicating leg L rises as the level of the water rises toward E and that leg at least is made in part transparent, as by being formed in the manner of a "gage glass," to permit observation of the level. The ratio of travel of the manometric liquid in the leg L to the fluctuations of the liquid level in the boiler may be suitably determined, taking into account the specific gravity of the manometric liquid, by properly proportioning the cross-sectional areas of the manometer legs.

A construction as above described is not in itself new, being in its essence disclosed at least as early as in the patent to Tripp and Wadleigh 722,645, March 10, 1903, and there have been later embodiments thereof. In practice these have not been found satisfactory, particularly for marine use. Usually the datum chamber 5 has been located exteriorly of the boiler at about the location of the ordinary gage glass, the two being commonly connected to the usual water column. Now, the usual gage is a far from satisfactory instrument, particularly on a moving vessel, and many of the constructions proposed indeed exaggerated the errors of a gage glass. My study of the prior constructions leads me to believe that the designers did not have an appreciation of the problems involved and accepted as a standard to which their indicators more or less approximated the ordinary gage glass in spite of its actual recognized inability to indicate clearly and accurately the water level. Thus, referring to Fig. 1, suppose that the boiler shown is tilted in the plane of the paper, as by a rolling or pitching of the vessel, so that the surface of the water standing at the level E therein assumes the position E'. This may be visualized by actually turning the drawing counterclockwise so that the line E' is horizontal. The body of water in the boiler surges toward the left-hand end thereof and in the proportion shown would rise completely above the top of gage glass G at that end of the boiler. If the ship then rolled in the opposite direction the water would sink to the bottom of the gage glass, and in the case of a vessel in a seaway there would be a constant fluctuation or surging in the glass.

Theoretically, as indicated by the line E', the level of water would be constant at the center line of the boiler. Of course, in practice the level of the water is affected by other causes, as, for example, "boils," whereby areas of higher level arise due to steam coming out of the tubes, but so far as bodily displacement of the system goes, the level of water at the center line should be as substantially constant as could be expected.

In the case of a U-tube having spaced legs as herein shown, a similar surging effect takes place as the system is inclined.

If the datum chamber 5 were located substantially at the center line of the boiler and the legs of the U-tube, at least in the indicating portions thereof, concentric or coaxial, as described in my copending application, Serial No. 460,216, filed Sept. 30, 1942, we would be measuring a theoretically constant height unaffected by surging by an instrument likewise unaffected thereby. For various reasons such a construction is not always practicable or desirable and in accordance with my present invention I provide for definitely spacing the datum chamber 5 from the center line of the boiler and correspondingly spacing the legs L and L' of the U-tube so that the surging effects in the boiler and at the manometer tend to compensate one another and to give a reasonably constant and accurate indication of the water levels in the boiler, as contrasted with the indications of a gage glass or installations of similar inaccuracy.

I will first discuss the matter from a theoretical standpoint and afterwards indicate certain practical considerations in the light of which the theoretical and mathematical analysis is to be interpreted and applied. Referring now to Fig. 1 and considering for the moment angular displacements in the plane of the paper, let us suppose that conditions in the boiler are equalized, the water level standing at the line E. The manometric liquid would stand at equal levels in the U-tube at the line e. We now wish to impose the condition that the indications at the U-tube will not be altered when the system is inclined. Let us assume that the system is inclined so that the water level takes the position of the line E'. The water level in the chamber 5 at the center line thereof then stands at a vertical distance above the line E' equal to $D \sin \theta$, where D is the distance between the center line of the boiler and the center line of the chamber 5 and $\theta$ is the angle between E and E', both as indicated on the drawing, and the difference between the heads impressed upon the two legs of the manometer is $D \sin \theta (Sp. B)$, where Sp. B denotes the specific gravity of the boiler water which is less than unity.

Considering now the U-tube, we demand that the surfaces of the manometric liquid therein remain at the line e. The displacement gives rise to a head in the right-hand leg L' equal to $d \sin \theta (Sp. G)$ where Sp. G denotes the specific gravity of the manometric liquid, and in the left-hand leg to a head in the opposite sense equal to $d \sin \theta (Sp. W)$, where Sp. W expresses the specific gravity of the water at the location of the manometer which, being at a different temperature from the water in the boiler, is different from Sp. B. For equilibrium, therefore, $D \sin \theta (Sp. B) = d \sin \theta (Sp. G - Sp. W)$ or $$\frac{d}{D} = \frac{Sp. B}{Sp. G - Sp. W}$$

Now, let us assume that the water in the boiler assumes the level indicated by the dotted line 10 in Fig. 1, giving rise to a differential head $H(Sp. B)$ therein. The level of the manometric liquid in the left-hand leg L will sink a distance R to the line 30 and in the right-hand leg will rise to the line 20 to produce a compensating head. As the columns are balanced in the regions between the lines 10 and 20 and in the regions below the line 30, the compensating head in the manometer thus produced is equal to $h(Sp. G - Sp. W)$. Hence $$\frac{h}{H} = \frac{Sp. B}{Sp. G - Sp. W}$$

Now, if we assume the system to tilt so that the water in the boiler now assumes the position of the dotted line 40, the same relation must be maintained. Clearly this will be true because both numerator and denominator of the first term of the above equation will be multiplied by $\cos \theta$, the angle of inclination measured at the center lines, and although the actual heads will vary with the inclination, their relation will be always the same. It will thus be seen that if D and d are properly correlated at the equalizing level so that there will be no error produced due to surging, the indications of the manometer will be proportional to the changes of level in the boiler without errors due to surging.

If the U-tube were of the inverted type with the manometric fluid having a specific gravity less than water, the expression $(Sp. G - Sp. W)$ derived in the preceding analysis would be $(Sp. W - Sp. G)$, or, expressing it generically, it is the arithmetical difference between the specific gravities of the manometric fluid and the water in the manometer whether the U-tube is of the erect or the inverted type.

It will be noted that in the above analysis the cross-sectional areas of the legs L and L' of the U-tube do not appear. The indications of the instrument are read in the leg L and the cross sections are chosen to give a reading, R, that is, a change in level from a zero point having a definite desired ratio (which may be unity) to the change in level in the boiler which is measured, H. The reading R or variation from e in the leg L is equal to the fraction $$\frac{h \ (\text{area } L')}{\text{area } L + \text{area } L'}$$

These areas do not affect the ratio of H to h or the trigonometric functions of the angle $\theta$.

Therefore, considering, as we have been doing, the plane of the center line of the boiler and the center line of the chamber 5 to be the same as the plane of the center lines of the legs of the U-tube, surging due to inclinations of the system corresponding to rotations in that plane will be without effect on the manometer. A vessel, however, may roll athwartships, or pitch fore and aft, or combine both these motions. Further analysis is diagrammed in a generalized form in Fig. 2. Any such motion may be considered as comprising two components in relatively vertical planes. Let us draw, therefore, in a horizontal plane as shown in Fig. 2 an x axis through the center line P of the cup 5 and a relatively perpendicular y axis through the center line C of the boiler (not necessarily athwartships and fore and aft planes) and let us draw parallel axes x' and y' through the legs L' and L respectively of the manometer. Considering movements in the plane of the y axis, the analysis which has been previously given in connection with Fig. 1 applies and $$\frac{LN}{CM} = \frac{Sp. B}{Sp. G - Sp. W}$$

and similarly $$\frac{NL'}{MP} = \frac{Sp. B}{Sp. G - Sp. W}$$

The triangles are similar and $$\frac{LL'}{CP} = \frac{d}{D} = \frac{Sp. B}{Sp. G - Sp. W}$$

and the plane of the center line of the boiler and the center line of the chamber 5 on the one hand and the plane of the legs L and L' of the manometer are parallel, or they may coincide if the four points are colinear.

It should be noted that to have the indicating surface in indicating leg L move in the same direction as the liquid in the container, the companion leg L', which communicates with the water-containing space of the boiler and in which the variable pressure is exerted, should be displaced therefrom in the same sense (to the right viewing Fig. 1) that the cup 5 is displaced relatively to the center line.

The vertical position of the manometer as a whole and its distance from the boiler may be determined by requirements of convenience within wide limits and will not affect the operation.

In a given installation it would ordinarily be convenient to fix the value of $d$ and then install the datum chamber 5 in accordance with the principles above explained. This is facilitated by placing the cup within the boiler as indicated in the diagram. To place such a cup within the boiler is not in itself new but it has not been suggested to place it in accordance with the hydrostatic principles explained, the location apparently having been made at random.

In the description hitherto the datum chamber or cup has been referred to as located at least as high as the normal "high" water level of the container and the connection therefrom is not only the "constant pressure" connection but the "high pressure" connection. In the case of a boiler with overflow to the water-containing spaces of the boiler or in the case of a cup within the shell of the container such a location would ordinarily be the most convenient. The essential point, however, is to establish a fixed head conveniently near to the normal operating levels in order to provide for a practicably small differential pressure at the manometer independently of the actual heads thereon which might be very great on account of the relative positions of the manometer and the container. This could be effected by a cup so located, for example, as to predetermine a fixed head slightly below the usual "low" water mark or at or about the "normal" operating level. In the analysis which has been given it will be noted that no assumption is made that the equalizing level at line E is at or near "high" water. The results are therefore general and apply to such cases as those just referred to.

The analysis which has been given has been absolute in its statement. In any physical construction, however, quantities are not the fixed and invariable quantities expressed by a mathematical equation. Not only may certain data be approximate, but a certain limit of accuracy in constructing a physical embodiment is assumed. Also variations even if beyond the reasonably possible accuracy of the operations involved may give desirably useful results. In the present instance the specific gravity of the water in the boiler is, of course, taken from an assumed normal steam pressure. The specific gravities of the water at the manometer and of the manometric fluid vary in accordance with the circumambient temperature. The determination of the center line of a large boiler drum would obviously not be accurate to very small fractions of an inch. Assuming the correctness of the center line, it would probably be feasible to determine the distance D to an accuracy of perhaps ⅛ of an inch, amounting to an error of about 5%. The coincidence or parallelism of the plane of the center line and the cup with the plane of the manometer legs can be quite accurately attained. We should not expect, however, in any instance that entire immobility of the indicating column at the manometer would be attained with the ship in a seaway, particularly since, as pointed out, the water level may be affected by other factors, and useful results will be attained if the theoretical installation is carried out without too great inaccuracies. The purpose is to provide an intelligent basis for the construction of the system in such manner that the surging of the liquid in the boiler and in the container are correlated so that they tend toward compensation to give an improved indication which may be most conveniently contrasted with the indication which would be given by a normal gage glass installed at the exterior of the boiler shell in the same plane through the center line as the cup 5 so as to be affected in like manner by either roll or pitch, and taking this as a standard of comparison, in referring to a substantial reduction in the fluctuation of the indicating surface I contemplate a reduction to an amount 25% or less of the fluctuation which would occur in such a glass.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In a liquid-level system for containers a manometer of the U-tube type having spaced legs, one of which is constructed to permit an observation of the level of manometric liquid therein to be made, one being connected to the liquid-containing space of the container beneath the operating levels therein, and a cup to which the other leg is connected, which cup is replenished with the liquid and has overflow means to establish therein a fixed head under the pressure of the container, said cup being spaced from the vertical center line of the container, the ratios of the distances of the legs from relatively perpendicular reference planes passing therethrough to the distances of the center lines of the container and cup respectively from parallel reference planes passing therethrough being substantially equal to the ratio between the specific weight of the liquid in the container to the arithmetical difference of the specific weights of the liquids in the manometer.

2. In a liquid-level system for containers a manometer of the U-tube type having spaced legs, one of which is constructed to permit an observation of the level of manometric liquid therein to be made, one being connected to the liquid-containing space of the container beneath the operating levels therein, and a cup to which the other leg is connected, which cup is replenished with the liquid and has overflow means to establish therein a fixed head under the pressure of the container, said cup being spaced from the vertical center line of the container, the legs of the U-tube being in a vertical plane substantially parallel to or substantially coincident with the common plane of the vertical center lines of the container and the cup, the spacing of the legs in their plane being proportioned to the spacing of said center lines in accordance with the ratio of the specific weight of the liquid in the cup to the arithmetical difference of the specific weights of the liquids in the manometer in such manner that surging of liquid in the container and surging of the manometric liquid are correlated to tend toward compensation and provide an indication in the manometer wherein fluctuation of the indicating level is substantially reduced as compared with that which would occur in an exterior gage class connected to the boiler shell in the same relative position to the center line as that occupied by the cup.

3. In a liquid level indicating system for containers a manometer of the U-tube type having spaced legs, one of which is constructed to permit an observation of the level of manometric liquid therein to be made, one leg being connected to the liquid-containing space of the container beneath the operating levels therein, and a cup to which the other leg is connected, which cup is replenished with the liquid and has overflow means to establish therein a fixed head under the pressure of the container, said cup being spaced from the vertical center line of the container, the legs of the U-tube being in a vertical plane substantially parallel to or coincident with the common plane of the vertical center lines of the container and the cup, the relative spacing of the legs in their plane and of the center lines in their plane being correlated so that the changes of head in the cup on the one hand and at the manometer on the other incident to equal angular displacements of the parts in said planes substantially compensate one another within the limits of error of the apparatus as a whole.

4. In a liquid-level system for containers a manometer of the U-tube type having spaced legs, one of which is constructed to permit an observation of the level of manometric liquid therein to be made, one leg being connected to the liquid-containing space of the container beneath the operating levels therein, and a cup to which the other leg is connected, which cup is replenished with the liquid and has overflow means to establish therein a fixed head under the pressure of the container, said cup being spaced from the vertical center line of the container, the distances of the legs from relatively perpendicular reference planes passing therethrough being proportioned to the distances of the vertical center lines of the cup and the container from parallel reference planes passing therethrough in accordance with the ratio of the specific weight of the liquid in the cup to the arithmetical difference of the specific weights of the liquids in the manometer in such manner that surging of liquid in the container and surging of the manometric liquid are correlated to tend toward compensation and provide an indication in the manometer wherein fluctuation of the indicating level is substantially reduced as compared with that which would occur in an exterior gage glass connected to the boiler shell in the same relative position to the center line as that occupied by the cup.

LEWIS B. WINTON.